United States Patent [19]

Hoffstein et al.

[11] Patent Number: 4,841,680
[45] Date of Patent: Jun. 27, 1989

[54] INVERTED CELL PAD MATERIAL FOR GRINDING, LAPPING, SHAPING AND POLISHING

[75] Inventors: Mark F. Hoffstein, Newark, Del.; Takehisa Shinagawa, Sakai, Japan

[73] Assignee: Rodel, Inc., Newark, Del.

[21] Appl. No.: 248,335

[22] Filed: Sep. 20, 1988

Related U.S. Application Data

[63] Continuation of Ser. No. 89,695, Aug. 25, 1987, abandoned.

[51] Int. Cl.$^4$ .......................... B24D 7/22; B24D 11/00
[52] U.S. Cl. ..................................... 51/283 R; 51/401; 51/395; 15/244.4; 428/316.6
[58] Field of Search ............. 51/281 R, 283 R, 284 R, 51/394, 395, 397, 398, 401, 402, 405, 406, DIG. 34, 317; 428/316.6; 15/244.4

[56] References Cited

U.S. PATENT DOCUMENTS

| | | |
|---|---|---|
| Re. 26,385 | 5/1968 | Gilchrist ...................... 428/316.6 X |
| 2,319,873 | 5/1943 | Linz ..................................... 15/244.4 |
| 2,996,409 | 8/1961 | Lavely .............................. 428/316.6 |
| 3,284,274 | 11/1966 | Hulslander et al. . |
| 3,504,457 | 4/1970 | Jaconsen et al. . |
| 3,841,031 | 10/1974 | Walsh ..................................... 51/283 |
| 4,255,164 | 3/1981 | Butzke .............................. 51/395 X |
| 4,537,817 | 8/1985 | Guillaume .................... 428/316.6 X |

FOREIGN PATENT DOCUMENTS 55-23954 6/1980 Japan .

Primary Examiner—Robert P. Olszewski
Attorney, Agent, or Firm—Panitch, Schwarze, Jacobs and Nadel

[57] ABSTRACT

A polishing pad material is provided with a cellular polymeric layer containing elongated cells normal to the major surfaces of the material, such that the cell openings on the polishing surface of the material comprise a majority of the surface area, and the cells have a mean diameter of about 50 to 200 microns with the diameter of the surface openings being preferably larger than the cell diameters below the surface. The cells are preferably cone-shaped and have a depth at least 1.5 times the diameter of the surface openings. The pad material is formed from a poromeric material, preferably polyurethane elastomer, with microporous cell walls having pore diameters less than 0.1 times the diameter of the cells. The polishing pad material may be made according to conventional poromeric technology, but instead of removing the usual top poromeric skin, the poromeric layer is inverted and the original bottom poromeric skin and any attached substrate are removed to open and expose the cells at a plane corresponding to their largest diameters.

8 Claims, 2 Drawing Sheets

INVERTED CELL PAD MATERIAL FOR GRINDING, LAPPING, SHAPING AND POLISHING This application is a continuation of application Ser. No. 189,695, filed 8/25/87, now abandoned.

FIELD OF THE INVENTION

This invention relates to pad materials used for the grinding, lapping, shaping and polishing of semiconductor wafers, metallurgical samples, memory disk surfaces, optical components, lenses, wafer masks and the like.

BACKGROUND OF THE INVENTION

In recent years, the requirements for miniaturization and ever higher circuit density have made the surface characteristics of integrated circuit substrates (e.g., silicon wafers) and magnetic substrates (e.g., aluminum memory disks) increasingly more critical. The present state of the art for achieving the highest precision surface (a process generally referred to as "polishing") involves using a slurry usually made up of a mechanical abrasive in combination with a chemical reagent. This slurry is typically wiped over the face of a workpiece by a porous polishing pad. The pad must be firm enough to provide the necessary wiping action and porous enough to hold slurry. The most widely used materials for such polishing pads are taken from a class of materials known as poromerics. Poromerics are textile-like materials that usually contain a urethane-based impregnation or coating having a multitude of pores or cells.

Many of the popular poromeric materials used for polishing are similar to the material described in U.S. Pat. No. 3,284,274. These polishing poromerics are somewhat different from most other poromerics in that the surface of polishing poromerics contains large macropores or cells. It is believed that these larger cells act to hold slurry and thus aid in the polishing process. U.S. Pat. No. 3,504,457 describes the use of these materials in polishing silicon semiconductor substrates.

FIG. 1 shows an enlarged elevation view of a slice through a typical state-of-the-art polishing pad material. The top layer 10 is the cellular poromeric that comes into contact with the workpiece. The top layer contains cells 20 which may have a diameter anywhere from a few microns to several hundred microns, but typically between 50 and 150 microns. The walls 30 of cells 20 can be solid, but more typically the walls are made up of microporous sponge, the diameter of the micropores 35 being substantially less than 0.1, and more typically less than 0.01, times the diameter of cells 20. FIG. 2 is a further enlarged view of a portion of layer 10 showing the micropores 35 of walls 30 in relation to cells 20.

Because the top poromeric layer 10 tends to be mechanically fragile, it is mounted on a substrate 40 such as a plastic film, heavy paper or a woven or non-woven textile, sometimes by means of an adhesive 45. The most common substrate currently used is a non-woven felt that has been impregnated with a filler or binder to give it strength, dimensional stability and the required degree of cushioning or firmness.

To manufacture the poromeric layer 10 for a polishing material such as shown in FIG. 1, it is customary to coat a solution of polymer onto a substrate and then immerse the coated substrate into a bath that will cause coagulation of the polymer. Once the polymer has been fully coagulated, the remaining solvent is leached out and the product dried. FIG. 3 shows an enlarged elevation view of a slice through a resulting poromeric layer 10 with the cellular porous structure produced by the coagulation process. The poromeric layer 10 may be considered for purposes of discussion to comprise four layers, namely a top skin 50, an active open cell area 60, a cell bottom plane 70 and a base layer 80, mounted on a manufacturing substrate 85.

The next step in the manufacturing process is to remove the top skin 50 by passing the poromeric under a knife or, more commonly, under a rotating abrasive cylinder. Once the top skin 50 is removed, the underlying pores (active area 60) are exposed and open to the surface. The poromeric film 10 may then be used directly, or in some cases it may be stripped off its manufacturing substrate 85 and relaminated to a substrate 40 more suited to its end use. In either case, the product then resembles FIG. 1.

An important characteristic of this prior art product is the configuration of its cell structure. Because of the nature of the coagulation process, the pores and cells tend to increase in diameter as they penetrate deeper into the material. This means that the diameters of the cells 20 exposed on the working surface 15 of the material are relatively small compared to the underlying cell diameters. The large cells 22 in the interior of the poromeric layer are connected to the surface by a relatively small opening 24, much as a vase or Erlenmeyer flask has a large volume and small opening. It is generally believed that the large cell volume with respect to its opening size is important to the polishing process in order that the pad material may carry the maximum amount of slurry to the workpiece.

However, in the polishing process, this small opening 24 has several detrimental side effects. First, it makes the product short lived. Dross and spent slurry fill up the underlying cells and, because of the small opening to the surface, cannot easily be flushed out and replaced with fresh slurry. The dross becomes impacted in the cell and ultimately ends the cell's ability to carry slurry. Second, a relatively high percentage of the surface area at the working surface 15 is composed of cell walls. This undesirably causes a high wiping friction at the same time as it decreases the presentation of fresh slurry to the face of the workpiece.

Finally, at the end of the polishing cycle, the prior art material is difficult to clean and therefore slows down the termination of the polishing process. It is a customary final step in the polishing process to rinse the workpiece with pure water while the workpiece is still in the polishing environment. Because of the relatively small cell opening 24, it takes a long time to flush the slurry out of the cell and replace it with fresh water.

One of the potential solutions to the above mentioned problems is to make a cellular structure by conventional foam-making techniques. Foams made by incorporating air, blowing agents or microvoids all have cellular structures in which the cells are essentially spherical. The skin can be skived off such foams to produce a surface of open cells similar in appearance to the surface to the conventional polishing pads described above. In polishing performance, however, foam type products do not work well.

It is believed that foam's poor performance is due to the geometry of the cells. In a foam structure, the cells are formed by bubbles randomly dispersed throughout the structure. When the skin is sliced off, the bubbles are intersected and opened at random planes through the spheres. Some bubbles have only their very tops sheared off, others are sheared near their midpoints, and still others are sheared very near their bottoms. The resulting cellular surface contains cells that have either of two undesirable features. If the cell has been sheared above its midpoint, then the diameter of its opening is smaller than the diameter of the underlying cell, and the cell has the same difficult-to-clean properties of conventional polishing materials. If the cell has been sheared at or below its midpoint, then the depth of the cell is much less than its diameter and it will not hold enough slurry.

BRIEF SUMMARY OF THE INVENTION

The present invention provides a novel polishing pad for use in the preparation of precision surfaces. The working surface of this pad is comprised of a microporous polymeric material which contains open cells that have their largest opening at the working surface and are deep enough to carry a relatively large quantity of slurry. By virtue of the larger surface opening, the cells of this pad are more easily flushed of dross and spent polishing media, greatly enhancing the performance of the pad when compared to prior art.

According to the present invention, a polishing material is provided with elongated, vertically oriented cells, in which the diameter of the cell at the surface of the material is at least as large and preferably larger than the cell diameter anywhere beneath the surface. A cell structure is provided wherein the average cell depth is at least 1.5 times the diameter of the cell at the cell opening.

The polishing pad material is made by conventional solvent/non-solvent polymer coagulation technology in which a solution of polymer is coated onto a first substrate, coagulated in a bath, followed by removing the solvent and drying the resulting poromeric layer. However, instead of removing the top skin of poromeric material, a second substrate is affixed to the top of the poromeric layer, and the first substrate is removed from the bottom of the layer along with sufficient adjacent poromeric material to expose and open the underlying cells. In a preferred embodiment, the first substrate is a releasable film, which is removed from the poromeric layer after the coagulation is substantially complete, but prior to complete removal of the solvent, so that only the fine microporous skin needs to be removed from the poromeric layer on the side opposite from the second substrate.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF PREFERRED EMBODIMENTS

The polishing pad of the present invention utilizes conventional poromeric manufacturing technology. The formation of a poromeric layer for the pad material is preferably carried out by a solvent/non-solvent coagulation process, as briefly described above. The particular poromeric material is not critical to the present invention, and suitable poromeric layers may be produced according to the methods described in U.S. Pat. No. 3,284,274 of Hulslander et al., the disclosure of which is incorporated herein by reference.

As with the Hulslander et al. patent, the major polymeric component which is preferred for forming the poromeric layers of the pad material according to the present invention is selected from polyurethane elastomers. The resulting poromeric layer contains elongated cells preferably having a mean diameter of about 50 to 200 microns and a cell depth at least 1.5 times the largest diameter of the cells. The mean diameter indicated above is a calculated volumetric mean, which varies considerably from lot to lot, but appears to correspond approximately to the diameter of the cell about one third the distance from the top (i.e. from the surface opening).

After the base layer 80 of the poromeric layer is removed, as described below, the cells will be exposed and, when inverted, open to the surface of the pad material at a plane which corresponds approximately to the largest diameters of the cells. As a result, the cell openings will cover a majority of the surface area of the polishing surface. That is, whereas in the prior art pad materials the narrowest diameters of the cells opened to the polishing surface and the polishing surface consisted mostly of end sections of cell walls, the situation with the materials of the present invention is just reversed. The inverted cell layer yields larger cell openings and fewer cell wall ends.

In the manner of a honeycomb, the cells are essentially closed at the sides and bottoms except for the micropores in the cell walls. That is, the cell walls should not be significantly porous to the polishing slurry, but should allow the cell to hold the slurry in the pad for supply to the polishing surface. Accordingly, manufacturing processes which result in wall openings or tears, open bottoms, or the like, should be avoided.

Figure 4:
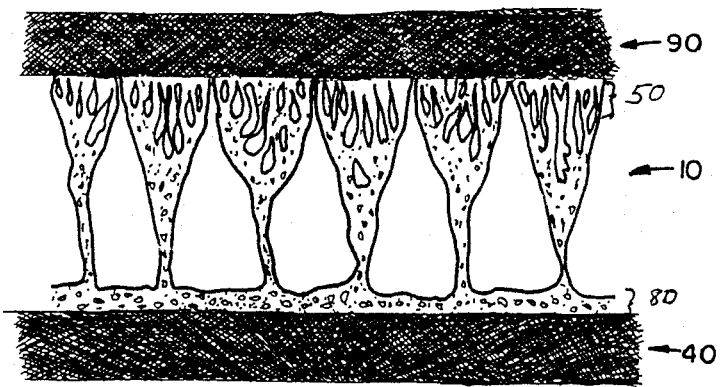
FIG. 4 is an enlarged elevation representation of a vertical slice through the substrates and poromeric layer of the present invention during an intermediate manufacturing step.
Figure 5A:
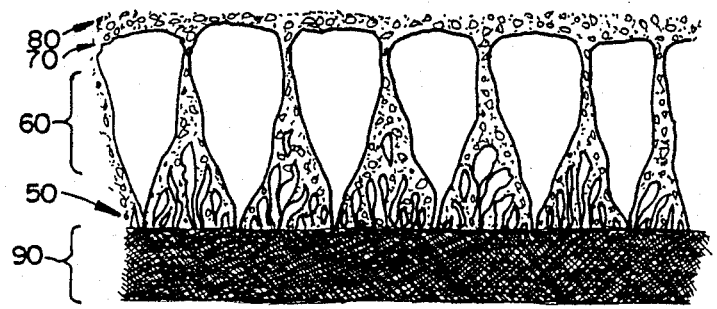
FIG. 5A is an enlarged elevation representation of a slice through a poromeric pad material according to the present invention just prior to removal of the poromeric skin.
Figure 5B:
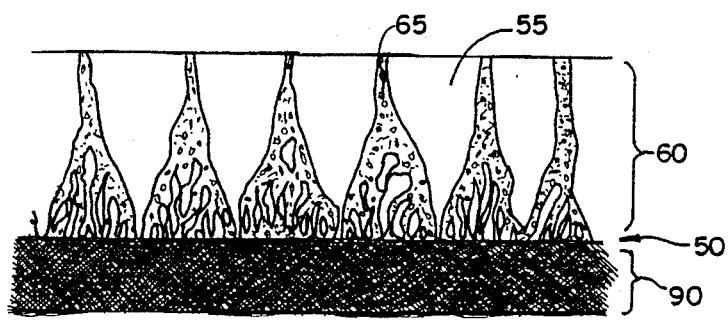
FIG. 5B is an enlarged elevation representation of a slice through a poromeric pad material according to the present invention.

The poromeric layer of the present invention is manufactured just as in the prior art up to the point of removing the top skin 50. Instead of removing the top skin, however, a new, second substrate 90 is bonded to the top skin 50 as shown in FIG. 4. The material is then inverted, and the original substrate 40 is removed. The material then appears as shown in FIG. 5A. Finally, as shown in FIG. 5B, the poromeric base layer 80 (now on top) is removed to expose and open the underlying cells 60. Of course, it will be understood that the original substrate 40 and the base layer 80 would normally be removed in a single operation, unless the substrate 40 is a releasable film. This unique construction produces a material that has the largest cell openings 55 at its surface 65.

It is important that the cells of this material are elongated (normal to the material layer) and not spherical. Were they spherical and truncated at their largest diameter, their volume would be half that of a sphere, namely $4/6\pi r^3$, and their depth one-half their diameter. It is preferable according to this invention that the cell shape be generally a "V " cross section or cone with a volume greater than $4/6\pi r^3$ and a depth (distance from top surface 65 to cell bottom (originally top skin) 50 at least 1.5 times the diameter of the cell openings 55 at the surface 65.

When used as a polishing pad, the material of this invention has greatly improved life, performance and cleanability, and reduced wiping friction. While the pad material of the present invention is referred to generally as a "polishing" pad, it will be understood that this term is used herein in its broadest sense to include such uses as grinding, lapping, shaping and other similar operations which will be apparent to those skilled in the art.

The invention will now be illustrated in more detail with reference to the following specific, non-limiting examples.

EXAMPLE 1

A polyurethane solution was first prepared as follows: 1000 parts of 1000 molecular weight polytetramethyleneether glycol were mixed with 87 parts of toluene diisocyanate (TDI) and heated for three hours at 90 degrees C. to form a hydroxyl terminated dimer. 1087 parts of this dimer were then mixed with 250 parts of methylene di-para-phenylene isocyanate (MDI) and heated for one hour at 80 degrees C. to form an isocyanate terminated dimer. All of the dimer was then dissolved in 5348 parts of N,N'-dimethylformamide (DMF). Into the resulting solution was added a second solution consisting of 32 parts hydrazine hydrate dissolved in 300 parts DMF, stirring during the addition and then maintained at 40 degrees C. for 30 minutes. The resulting solution of polyurethane has a viscosity of about 120 poises and a polymer content of about 20 percent.

A polymer solution consisting of 10.5% polyurethane, 5.7% polyvinyl chloride (PVC) and 2% carbon black was prepared by adding 762 parts of PVC to 6171 parts DMF, milling in 279 parts of carbon black, and adding the resulting liquid to 7017 parts of the polyurethane solution prepared above. The PVC used in this example was a high molecular weight PVC homopolymer (Tenneco BR-530). In order to form the proper cellular structure, it is important that the PVC have a lower tolerance for water in the DMF than the polyurethane has. The polyurethane solution used here will typically begin room temperature precipitation when water levels in the DMF reach 3.5%. The PVC solution used here precipitates when the water level reaches 2.5%. This 1% difference is important to formation of the proper cellular structure.

A 28 mil thick bonded sheet of polyester fibers weighing approximately 6 ounces per square yard was selected as the manufacturing substrate. In this case, the substrate used was Remay style 2470, manufactured by E. I. DuPont de Nemours & Co., Wilmington, Del.

A 60 mil film of the polymer solution prepared above was then coated onto the manufacturing substrate using a knife over roll coater. The coated substrate was then dipped in a room temperature water bath until the polymer was fully coagulated. The product was then washed to remove all traces of DMF and then dried over steam drums.

After drying, it was found that the poromeric layer had shrunk to about 22 mils thickness. Beneath a microporous surface skin 3 to 7 mils thick, the poromeric contained a 15 to 19 mil thick layer of vertically oriented cells much like a honeycomb. Unlike a honeycomb, however, the cells in this product tended to be shaped like a vase or Erlenmeyer flask, similar to the cells shown in the Figures. Examination of a cross section of the poromeric layer showed that in the zone 5 to 20 mils below the surface, as the field of view moved away from the surface and deeper into the layer, the number of cells decreased and the average diameter of each cell increased. The cells bottomed at the interface with the substrate.

Figure 1:
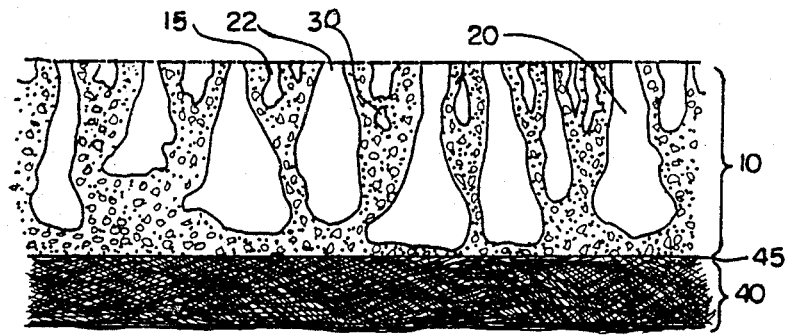
FIGS. 1-3 are enlarged elevation representations of vertical slices through layers of poromeric pad according to the prior art.
Figure 2:
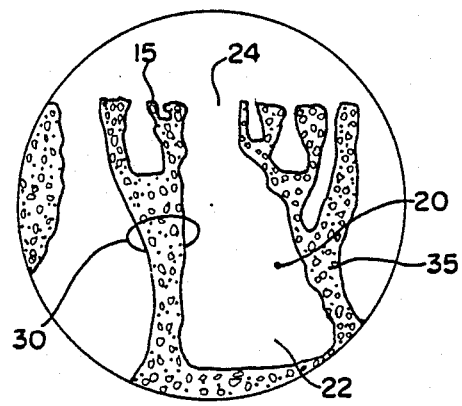
Figure 3:
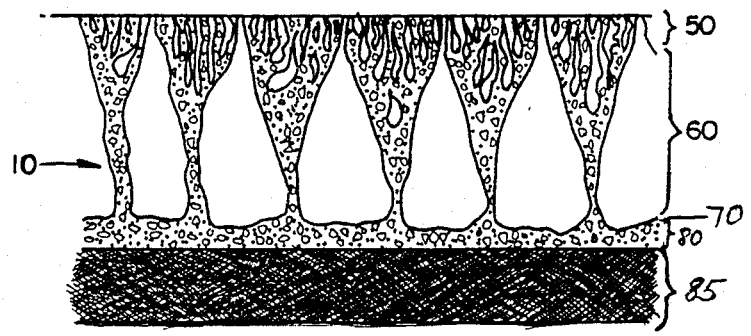

A second piece of Remay, the same as the manufacturing substrate, was then bonded to the top skin of the poromeric as shown in FIG. 4 using a liquid urethane adhesive. After the adhesive had set, the product was then inverted and passed beneath the abrasive cylinder of a buffing machine to remove the manufacturing substrate. Care was taken to buff just deep enough to remove the manufacturing substrate and expose the full diameter (largest diameters of the cells) of the cellular layer, as shown in FIG. 5B. This can best be visualized by imagining the base cells in the poromeric layer to be a honeycomb of Erlenmeyer flasks (now inverted), and buffing just deep enough to remove not only the manufacturing substrate, but also to grind off the bases of the Erlenmeyer flasks. The resultant product was then tested against a conventional cellular poromeric, such as that of FIG. 1, as a polishing pad.

By way of comparison, the conventional cellular poromeric pad material was made by following the above procedure up through the point where the poromeric was dried. After drying, the poromeric was buffed to remove the top skin and expose the underlying cells. This entailed the removal of about 8 mils of material leaving a final poromeric thickness of 14 mils. As expected, an examination of a vertical slice of this material showed a cellular structure similar to a row of erlenmeyer flasks in upright orientation, similar to FIG. 1.

Comparison polishing tests between the two products showed that the conventional material required dressing (scraping or brushing of the pad between uses to clean the pad and remove buildup of hard slurry particles) two to three times as often to retain its polishing efficacy. The coefficient of friction of the conventional material was about 20% higher. The biggest difference, however, was noted in lifetime. Lifetime was considered at an end when dressing could no longer restore the pad to useful performance. Although evaluations were very subjective, in a series of tests the product of this example was found to last on the average about two to three times as long as the conventional material.

EXAMPLE 2

In this example, the manufacturing substrate is reusable. A polymer solution was prepared in exactly the same way as Example 1. Using a knife over roll coater, a 60 mil film of this solution was coated on a continuous sheet of polyester (Mylar) film. The coated film was then run through a water bath to coagulate the polymer and leach out about 65% of the DMF. At this point, the poromeric film was strong enough to strip away from the Mylar. The poromeric film was then washed using tenter frame washing equipment common to the textile industry. Washing proceeded more easily than in the first example because there was no manufacturing substrate to slow down the replacement of DMF with water. After washing, the poromeric film was dried on steam heated drying drums at 145 degrees C.

The top of the poromeric film was then laminated to a Remay substrate in the exact same manner as in Example 1. After laminating and inverting the poromeric film as shown in FIG. 5A, the upper surface of the film (the surface that had been the base against the Mylar during manufacture) was removed by buffing to expose the underlying cells as shown in FIG. 5B. Buffing the product of this example was easier than that of Example 1, because there was no manufacturing substrate to remove.

In polishing tests, the product of this example performed virtually identically to that of Example 1.

The present invention may be embodied in other specific forms, without departing from the spirit or essential attributes thereof and, accordingly, reference should be made to the appended claims, rather than to the foregoing specification, as indicating the scope of the invention.

We claim:

1. A polishing pad material comprising a cellular polymeric layer containing elongated cells which are generally oriented normal to and have an opening on the polishing surface of said material, said cell openings comprising a majority of the surface area of said polishing surface, the depth of said cells is at least 1.5 times the diameter of the surface openings, and said cells having a mean diameter of about 50 to 200 microns with the diameter of said openings being generally larger than the diameter beneath the surface.

2. A polishing pad material according to claim 1 wherein said layer is a poromeric material.

3. A polishing pad material according to claim 2 wherein said poromeric material comprises a polyurethane elastomer.

4. A polishing pad material according to claim 2 wherein said poromeric material has microporous walls between the cells, the diameter of the pores of the microporous walls being less than 0.1 times the mean diameter of the cells.

5. A pad material according to claim 1 wherein said layer is affixed to a substrate on the surface of the layer opposite from said openings.

6. A polishing pad material according to claim 1 wherein said cells are generally cone-shaped with the opening on the polishing surface.

7. In a method of polishing objects with a pad material and an abrasive slurry, the improvement comprising using the polishing pad material of claim 1 as the pad material.

8. A method according to claim 7 wherein said object to be polished is selected from the group consisting of semiconductor wafers, metallurgical samples, memory disk surfaces, optical components, lenses and wafer masks.

* * * * *